US010478872B2

(12) United States Patent
Palisson et al.

(10) Patent No.: US 10,478,872 B2
(45) Date of Patent: Nov. 19, 2019

(54) METHOD AND STATION FOR TREATMENT OF A TRANSPORT CONTAINER MADE OF PLASTIC MATERIAL FOR THE ATMOSPHERIC STORAGE AND CONVEYANCE OF SUBSTRATES

(71) Applicant: PFEIFFER VACUUM, Annecy (FR)

(72) Inventors: Julien Palisson, Sillingy (FR); Catherine Le Guet, La Motte Servolex (FR)

(73) Assignee: PFEIFFER VACUUM, Annecy (FR)

( * ) Notice: Subject to any disclaimer, the term of this patent is extended or adjusted under 35 U.S.C. 154(b) by 138 days.

(21) Appl. No.: 15/325,337

(22) PCT Filed: Jul. 3, 2015

(86) PCT No.: PCT/EP2015/065171
§ 371 (c)(1),
(2) Date: Jan. 10, 2017

(87) PCT Pub. No.: WO2016/012216
PCT Pub. Date: Jan. 28, 2016

(65) Prior Publication Data

US 2017/0182526 A1 Jun. 29, 2017

(30) Foreign Application Priority Data

Jul. 24, 2014 (FR) ..................................... 14 57174

(51) Int. Cl.
*B60S 1/38* (2006.01)
*B08B 9/40* (2006.01)
(Continued)

(52) U.S. Cl.
CPC .............. *B08B 9/40* (2013.01); *B08B 7/0035* (2013.01); *B08B 9/0861* (2013.01); *B08B 9/205* (2013.01)

(58) Field of Classification Search
None
See application file for complete search history.

(56) References Cited

U.S. PATENT DOCUMENTS 6,230,719 B1 5/2001 Wensel
6,564,810 B1 5/2003 Raaijmakers et al.
(Continued)

FOREIGN PATENT DOCUMENTS

CA 2 494 107 A1 7/2006
CN 101821573 A 9/2010
(Continued)

OTHER PUBLICATIONS

Espacenet translation of CN101821573, retrieved from https://worldwide.espacenet.com/publicationDetails/biblio?II =1&ND=3&adjacent=true&locale=en EP&FT=D&date=20100901&CC=CN&NR=101821573A&KC=A on Feb. 28, 2019 (Year: 2019).*
(Continued)

*Primary Examiner* — Eric W Golightly
(74) *Attorney, Agent, or Firm* — Oblon, McClelland, Maier & Neustadt, L.L.P.

(57) ABSTRACT

A method for treatment of a plastic transport box for conveyance and atmospheric storage of substrates including walls bounding a volume intended for storage of substrates, and a station for treatment of transport boxes for conveyance and atmospheric storage of substrates, the method including: at least one plasma treatment in which at least one interior wall of the transport box is subjected to a plasma of a treatment gas at a gas pressure lower than 10000 pascals.

11 Claims, 4 Drawing Sheets

(51) Int. Cl.

| | |
|---|---|
| ***B08B 7/00*** | (2006.01) |
| ***B08B 9/08*** | (2006.01) |
| ***B08B 9/20*** | (2006.01) |

(56) References Cited

U.S. PATENT DOCUMENTS

| | | | | |
|---|---|---|---|---|
| 2001/0012681 | A1 | 8/2001 | Wensel | |
| 2001/0032706 | A1 | 10/2001 | Wensel | |
| 2003/0205251 | A1 | 11/2003 | Raaijmakers et al. | |
| 2003/0232150 | A1* | 12/2003 | Arnold | B08B 7/00 427/569 |
| 2010/0126531 | A1 | 5/2010 | Ku et al. | |

FOREIGN PATENT DOCUMENTS

| | | | | |
|---|---|---|---|---|
| JP | 8-59863 | | 3/1996 | |
| JP | 2000-265275 | A | 9/2000 | |
| JP | 2003-159570 | A | 6/2003 | |
| JP | 2010-536185 | A | 11/2010 | |
| TW | 201011804 | A1 | 3/2010 | |
| TW | 201021101 | A1 | 6/2010 | |
| WO | WO-2009021941 | A1 * | 2/2009 | F26B 5/04 |
| WO | 2013/112364 | A1 | 8/2013 | |

OTHER PUBLICATIONS

International Search Report dated Oct. 2, 2015 in PCT/EP2015/065171 filed Jul. 3, 2015.

Taiwanese Office Action and Search Report with English translation dated Nov. 6, 2018 in corresponding Taiwan Patent Application No. 104122045, citing documents AO and AP—therein (14 pages).

Chinese Office Action with English translation dated Nov. 22, 2018 in corresponding Chinese Patent Application No. 201580040238.X, citing document AO therein (10 pages).

Japanese Office Action with English translation dated Jun. 4, 2019 in corresponding Japanese Patent Application No. 2017-503855, citing documents AO-AR therein (11 pages).

Chinese Office Action with English translation dated Aug. 5, 2019 in corresponding Chinese Patent Application No. 201580040238.X (10 Pages).

* cited by examiner

FIG. 4a
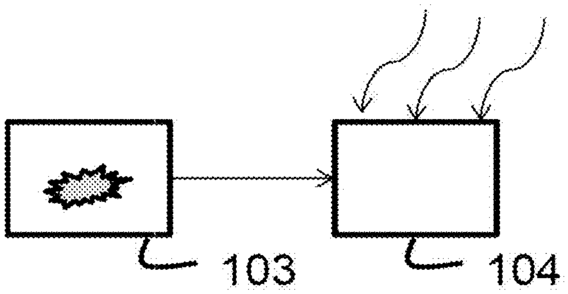
FIG. 4b
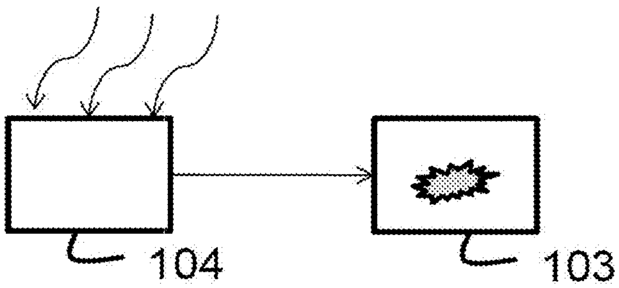
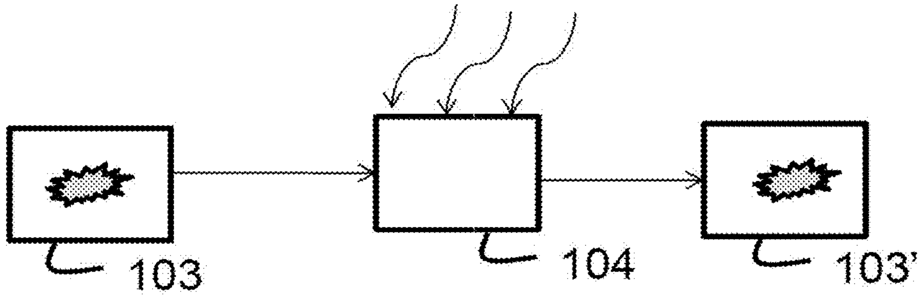
FIG. 4c
FIG. 5a
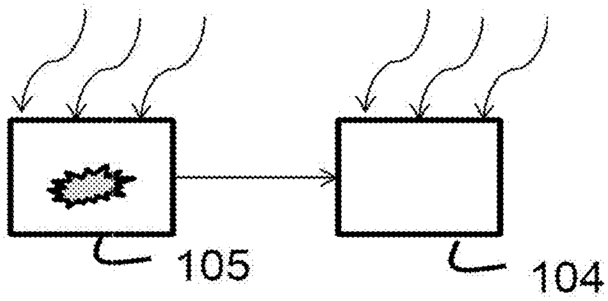

FIG. 5b
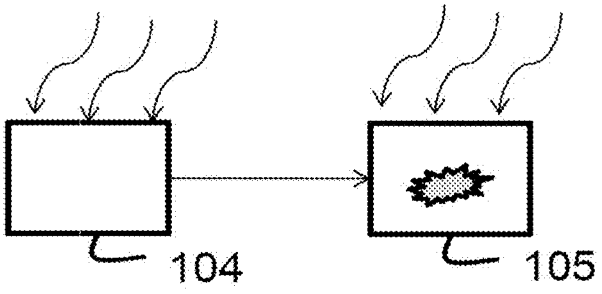
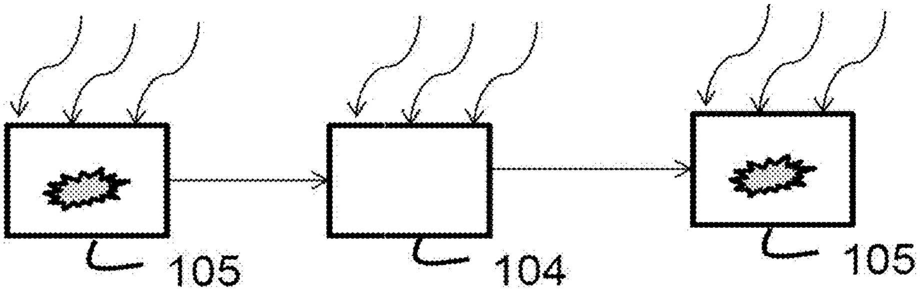
FIG. 5c
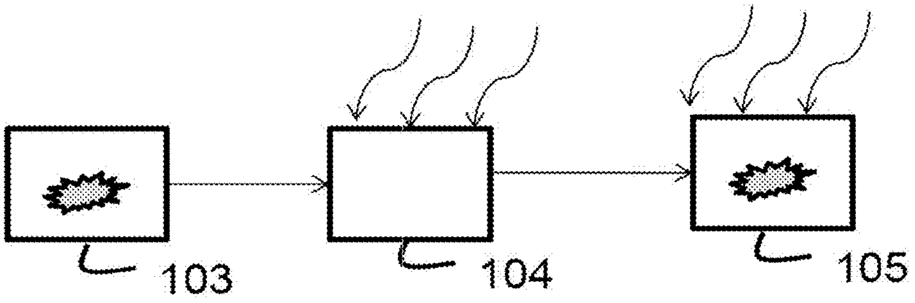
FIG. 6

METHOD AND STATION FOR TREATMENT OF A TRANSPORT CONTAINER MADE OF PLASTIC MATERIAL FOR THE ATMOSPHERIC STORAGE AND CONVEYANCE OF SUBSTRATES

TECHNICAL FIELD

The present invention relates to a method for treatment of a plastic transport box for conveyance and atmospheric storage of substrates such as semiconductor wafers or photomasks, the transport boxes possibly having been cleaned in a liquid, for example washed in pure water, beforehand.

DESCRIPTION OF THE RELATED ART

Transport and storage boxes define an enclosed space for transportation and storage of one or more substrates, said space, which is at atmospheric pressure, separating the substrate(s) from the use/transportation environment.

In the semiconductor fabrication industry, these boxes allow substrates, such as semiconductor wafers or photomasks, to be transported from one tool to another or these substrates to be stored between two fabrication steps.

Boxes of this type especially include the following three types of standardised wafer transport and storage boxes: FOUPs (front-opening unified pods) and FOSBs (front-opening shipping boxes), which are front opening, and SMIF pods (standard mechanical interface pods), which are bottom opening; and the boxes referred to as open cassettes; the standardised photomask transport and storage boxes referred to as RSPs (reticle SMIF pods); and the substrate transport boxes used in the solar industry.

These boxes, which are made of plastic, and generally of a polymer such as polycarbonate, may be contaminated by fabrication treatment gases, such as by gaseous HF, HCL, $NH_3$ and PGMEA, these gases especially being released by semiconductor wafers that have undergone prior fabrication operations.

The gases released may adsorb on the surface of the boxes, then diffuse into the polymer, thereby leading contaminating molecules to accumulate in the polymer. These contaminating molecules may subsequently desorb, adsorb on the surface of the substrates stored in these boxes, and possibly react chemically therewith, this possibly creating defects on the surface of the substrates.

Provision is therefore made to regularly clean these boxes by washing them in a liquid such as deionized water, this allowing the surface of the containers to be decontaminated. However, certain contaminants that have diffused into the plastic are not removed and therefore remain a possible source of contamination.

Moreover, this washing step is followed by a drying step that can be very long, for example comprising a phase in which the transport boxes are heated by convection of hot air heated by infrared radiation, and centrifuged; followed by a phase in which the transport boxes are left in open air. Specifically, cleaning fluid residues and water vapour in particular are major contaminants that must be removed.

A method for drying boxes after they have been washed, in which provision is especially made to improve decontamination in/by volume of the boxes, is known from document WO2009021941A1. This method consists in subjecting the transport box to the combined action of a subatmospheric gas pressure and infrared radiation. The heating due to the infrared radiation allows contaminants that have diffused into the thickness of the polymer to be effectively desorbed and thus their removal to be accelerated.

However, it would, at the present time, still be desirable to further improve the effectiveness of the method and to decrease its duration.

SUMMARY

For this purpose, one subject of the invention is a method for treatment of a plastic transport box for conveyance and atmospheric storage of substrates having walls bounding a volume intended for storage of substrates, characterized in that it comprises at least one plasma treatment step in which at least one interior wall of said transport box is subjected to a plasma of a treatment gas at a gas pressure lower than 10000 pascals.

The plasma treatment step allows the surface of the interior wall of the transport box to be treated, via a chemical or mechanical action, in order to remove contaminating molecules. Specifically, the plasma delivers energy that promotes the decoupling, via a mechanical action, of molecules attached to the surface of the plastic transport boxes. The plasma may also have a chemical action because the ionized species generated may react with contaminants and thereby promote their removal. The generation of a plasma in the transport box therefore allows surface decontamination to be accelerated relative to a simple vacuum heating operation.

The treatment method may have one or more of the following features or one or more combinations thereof:

- in the plasma treatment step, at least the interior wall of the transport box is heated to a temperature above 50° C., such as to 70° C.; decontamination of the surface and volume of the interior wall of the transport box is thus simultaneously improved;
- in the plasma treatment step, the gas pressure is comprised between 1000 and 0.1 pascals;
- in at least one plasma treatment step, the treatment gas is chosen from a noble gas, such as argon, or from a reactive gas, such as oxygen, nitrogen or water vapour;
- in at least one plasma treatment step, the plasma is, for a predetermined duration, alternatively ignited and extinguished several times; an intermittent plasma makes it possible to prevent the degradation of the plastic of the transport boxes that could possibly result from the bombardment of the material with the ionized species of the plasma, or ageing of the plastic that could possibly result from chemical etching by the ionized species and the generation of UV by the plasma;
- the treatment method comprises a non-plasma treatment step in which at least the interior wall of the transport box is subjected to the combined action of a gas pressure lower than 10000 pascals and heating to a temperature above 50° C.;
- in the non-plasma treatment step, the gas pressure is lower than the gas pressure in the plasma treatment step;
- in the non-plasma treatment step, the gas pressure is lower than 100 pascals;
- the treatment method comprises a non-plasma treatment step preceded by a plasma treatment step;
- the treatment method comprises a non-plasma treatment step followed by a plasma treatment step; the subsequent plasma treatment step may allow the surfaces of the transport box to be conditioned by modifying the contact angle of the surfaces, for example so that the transport boxes desorb less than before treatment or so that the interior wall of the transport box adsorbs better than before treatment; and the treatment method comprises a non-plasma treatment step preceded by a prior plasma treatment step and followed by a subsequent plasma treatment step, and the plasmas of the prior and subsequent plasma treatment steps are different.

Another subject of the invention is a station for treatment of transport boxes for conveyance and atmospheric storage of substrates, comprising:

a sealed chamber suitable for receiving at least one interior wall of a plastic transport box for conveyance and atmospheric storage of substrates;

pumping means connected to the sealed chamber; and at least one infrared radiation source;

characterized in that it comprises a plasma source and a processing unit suitable for controlling the pumping means, the infrared radiation source and the plasma source so as to implement a method for treatment of a plastic transport box for conveyance and atmospheric storage of substrates such as described above.

BRIEF DESCRIPTION OF THE DRAWINGS

Other features and advantages of the invention will become apparent from the following description, which is nonlimiting in nature and given, by way of example, with regard to the appended drawings, in which:

FIG. 4*a* shows an exemplary embodiment of the treatment method;

FIG. 4*b* shows another exemplary embodiment of the treatment method;

FIG. 4*c* shows another exemplary embodiment of the treatment method;

FIG. 5*a* shows another exemplary embodiment of the treatment method;

FIG. 5*b* shows another exemplary embodiment of the treatment method;

FIG. 5*c* shows another exemplary embodiment of the treatment method; and

FIG. 6 shows another exemplary embodiment of the treatment method;

DETAILED DESCRIPTION

In these figures, identical elements have been referenced with the same reference numbers. The steps of the method are numbered starting from 100.

Figure 1:
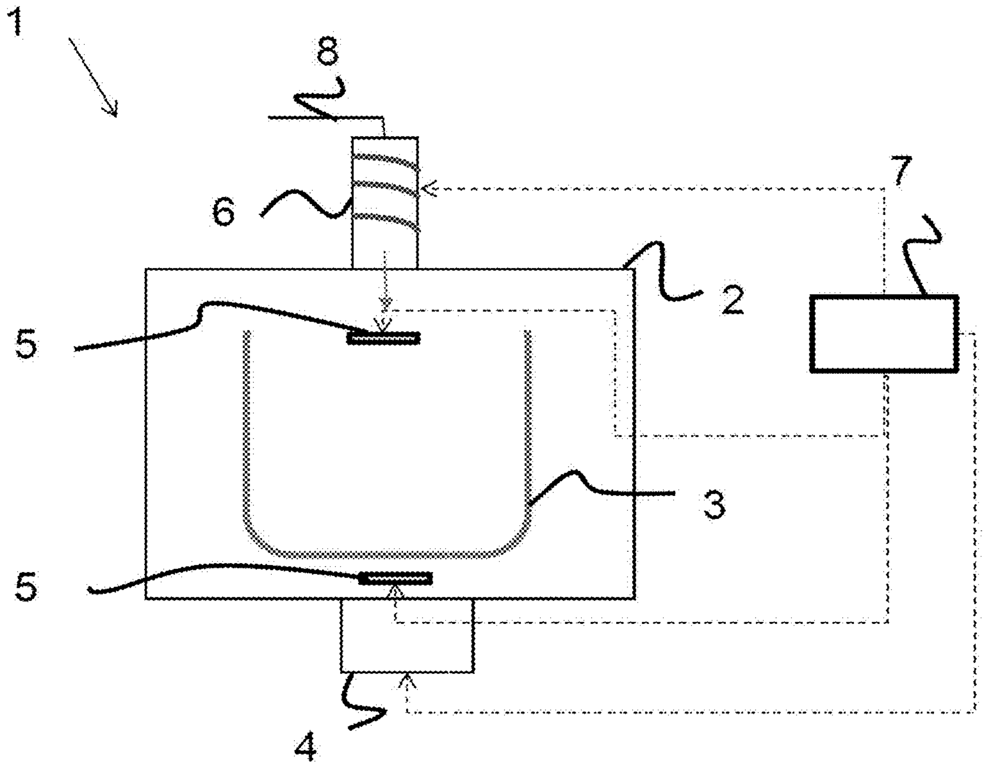
FIG. 1 shows a schematic view of a treatment station.

FIG. 1 shows an exemplary station 1 for treatment of transport boxes for conveyance and atmospheric storage of substrates.

The treatment station 1 comprises a sealed chamber 2 suitable for receiving at least one wall of at least one plastic transport box 3, pumping means 4 connected to the sealed chamber 2, at least one infrared radiation source 5, a plasma source 6 and a processing unit 7.

The plastic transport box comprises walls bounding an interior volume intended for the storage of substrates, such as semiconductor wafers, photomasks or thin films for the solar industry. It is a means for conveyance and atmospheric storage of substrates. One wall of the transport box 3 is for example a hollow peripheral envelope (FIG. 1) or a lid (not shown) that couples to the hollow peripheral envelope 3 in order to form a box, the interior walls being those defining the interior volume intended for the storage of substrates.

The transport box may especially be a standardised transport enclosure such as a FOUP, FOSB, SMIF Pod, RSP or “open cassette”, or a transport enclosure for solar panel substrates.

The plastic transport box is for example made of a polymer such as polycarbonate.

The treatment station 1 may be connected to a tool for wet cleaning transport boxes, comprising a means for conveying the transport box from the cleaning tool to said treatment station 1.

Figure 2:
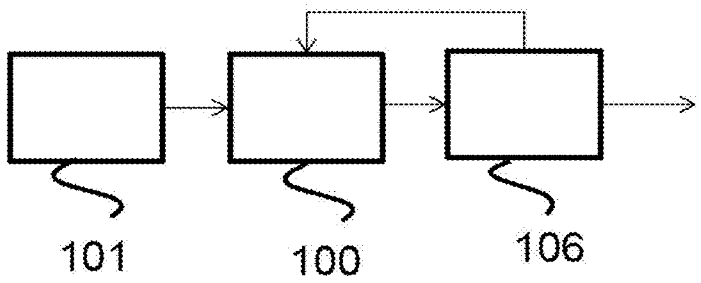
FIG. 2 is a flowchart showing the various steps of a method for treatment of a plastic transport box.

The processing unit 7 is configured to control the pumping means 4, the one or more infrared radiation sources 5 and the plasma source 6 so as to implement a method 100, such as illustrated in FIG. 2, for treatment of a plastic transport box for conveyance and atmospheric storage of substrates.

The treatment method 100 comprises at least one plasma treatment step 103; 105 in which at least one wall of the transport box 3 is placed in the sealed chamber 2 so that it may be subjected to a plasma of a treatment gas at a gas pressure lower than 10000 pascals (or 100 mbar), the interior wall of the transport box 3 possibly having been cleaned in a liquid, for example washed in deionized water (as in step 101), beforehand.

At least the internal face of the wall of the transport box 3 is subjected to the plasma.

The gas pressure of the treatment gas is for example comprised between 1000 Pa (or 10 mbar) and 0.1 Pa (or $10^{-3}$ mbar). One wall of the transport box, or the open transport box, is placed in the sealed chamber 2 so that the wall of the transport box does not deform when the box is placed under vacuum.

The plasma treatment step 103; 105 allows the surface of the interior wall of the transport box 3 to be treated, either via a chemical action or via a mechanical action, in order to remove contaminating molecules. Specifically, the plasma delivers energy that promotes the decoupling, via a mechanical action, of molecules attached to the surface of the plastic transport boxes. The plasma may also have a chemical action because the ionized species generated may react with contaminants and thereby promote their removal. The generation of a plasma on the transport box therefore allows surface decontamination to be accelerated relative to a simple vacuum heating operation.

The plasma is generated by means of the plasma source 6, for example an ICP, RF, microwave or capacitive type source.

The sealed chamber 2 comprises at least one device for introducing treatment gas 8, in order to introduce at least one treatment gas in the plasma treatment step 103; 105. The treatment gas may be chosen from a noble gas, such as argon, or from a reactive gas such as oxygen, nitrogen or water vapour.

In the case of a noble gas plasma provided with sufficient energy, the ionized species may have an ionic sputtering action: the ions that bombard the surface of the interior wall of the plastic transport box 3 pull out molecules from the surface of the bombarded material.

In the case of a reactive gas plasma, the ionized species created are liable to react with molecules on the surface of the plastic: oxygen is especially used to remove resist residues and hydrogen to remove carbon-containing contaminants and acids with a higher efficacy than is achieved by simply heating the transport box under vacuum.

The device for introducing treatment gas 8 may furthermore also be used to introduce a clean gas, such as dry nitrogen, in order to vent the sealed chamber 2 to atmospheric pressure after the transport box has been treated.

Figure 3:
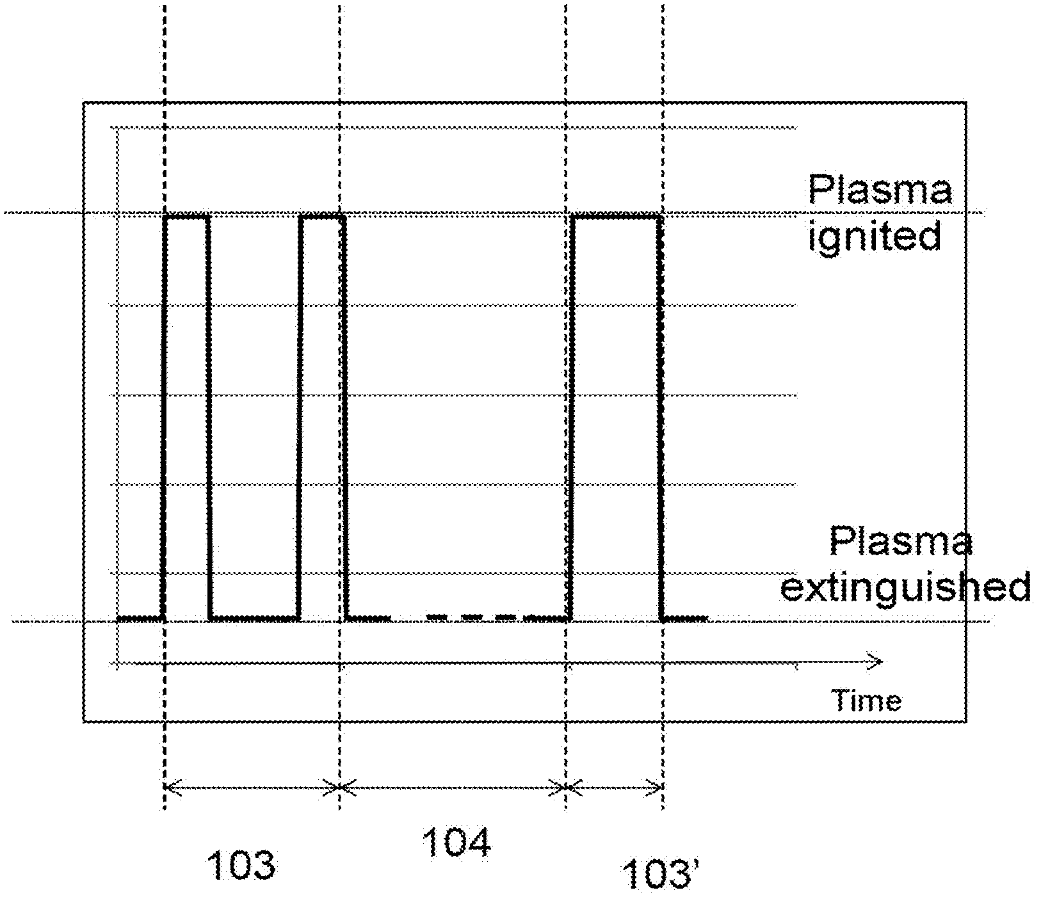
FIG. 3 is a schematic illustrating an example of an intermittent plasma with phases of ignition and extinguishment of the plasma in one treatment method.

According to one exemplary embodiment, the plasma is, for a predetermined duration, alternatively ignited and extinguished several times. The alternation may be periodic or partially periodic. The predetermined duration over which the plasma is intermittent may be the entire duration or part of the duration of the plasma treatment step 103; 105. For example, and such as shown in FIG. 3, the plasma is, in a plasma treatment step 103, ignited, extinguished and then reignited once.

An intermittent plasma makes it possible to prevent the degradation of the plastic of the transport boxes that could possibly result from the bombardment of the material with the ionized species of the plasma, or ageing of the plastic that could possibly result from chemical etching by the ionized species and the generation of UV by the plasma.

Furthermore, it is possible to heat at least the interior wall of the transport box 3 to a temperature above 50° C., such as to about 70° C., at the same time as it is subjected to the plasma. The decontamination of the surface and volume of the interior wall of the transport box 3 is thus simultaneously improved. Moreover, by heating the wall of the transport box 3 at the same time as the plasma, the risk of condensation or solidification of gaseous species, such as water vapour, which may especially occur if the treatment method starts with a very low pressure plasma treatment step 105 (pressure of about 0.1 Pa ($10^{-3}$ mbar)), is decreased. However, the temperature is kept below a permissible temperature limit beyond which the plastic transport box may be degraded, 100° C. for example.

Provision may also be made for the treatment method 100 to comprise a non-plasma treatment step 104 in which the interior wall of the plastic transport box 3 is subjected, without plasma, to the combined action of a gas pressure lower than 10000 pascals and heating to a temperature higher than 50° C., such as to about 70° C.

The non-plasma treatment step 104 especially allows degassing of the volume of the transport box to be accentuated. Specifically, in the absence of a plasma and because the wall of the transport box 3 is heated, it is possible to accelerate degassing for example by further decreasing the gas pressure to which the wall of the transport box 3 is subjected to below that of the plasma treatment step 103; 105. In the non-plasma treatment step 104, the gas pressure is for example lower than 100 Pa (or 1 mbar), such as comprised between 100 Pa (or 1 mbar) and $10^{-4}$ Pa ($10^{-6}$ mbar).

The plastic transport box may be heated in the plasma treatment steps 103; 105 or non-plasma treatment step 104 by subjecting the interior wall of the transport box 3 to infrared radiation. The infrared radiation preferably has an emission spectrum having maximum intensities in the vicinity of the one or more absorption wavelengths of the one or more contaminant molecules to be removed.

Preferably, the infrared radiation may be amplitude modulated. Amplitude modulated infrared radiation allows the temperature of the material of the plastic transport box to be kept in the vicinity of a temperature setpoint while the emission spectrum of the infrared radiation is controlled separately. The radiation may thus be chosen so as to preferentially act on water-based contaminant molecules to be removed. The infrared radiation may also comprise a continuous initial step of bringing the surface to be treated to a suitable temperature in order to decrease the time taken to reach the suitable temperature, thus substantially decreasing the treatment time.

A plurality of configurations are possible in the treatment method 100.

According to a first example, illustrated in FIG. 4*a*, the treatment method comprises a non-plasma treatment step 104, preceded by a plasma treatment step 103 without heating.

According to a second example, illustrated in FIG. 4*b*, the non-plasma treatment step 104 is followed by a plasma treatment step 103 without heating. The subsequent plasma treatment step may allow the surfaces of the transport box to be conditioned by modifying the contact angle of the surfaces, for example so that the transport boxes desorb less than before treatment or so that the interior wall of the transport box 3 adsorbs better than before treatment It is also possible to make provision for the treatment method 100 to comprise a prior plasma treatment step 103, followed by a non-plasma treatment step 104, followed by a subsequent plasma treatment step 103', as illustrated in FIGS. 3 and 4*c*. The plasmas of the prior and subsequent plasma treatment steps 103, 103' may be different: the treatment gas, the gas pressure and/or the energy of the plasma may be different in the prior and subsequent plasma treatment steps 103, 103'.

Furthermore, the cycles shown in FIGS. 4*a*, 4*b* and 4*c* may be repeated and/or combined.

According to another exemplary embodiment, in the plasma treatment step 105 the interior wall of the transport box 3 is heated. This heated plasma treatment step 105 may be followed by a non-plasma treatment step 104 (FIG. 5*a*) or be preceded by a non-plasma treatment step (FIG. 5*b*), or a heated plasma treatment step 105 may precede and follow a non-plasma treatment step 104 (FIG. 4*c*)

Furthermore, the cycles shown in FIGS. 5*a*, 5*b* and 5*c* may be repeated and/or combined.

Moreover, other combinations are possible, for example, the method may comprise a first plasma treatment step 103 without heating, followed by a non-plasma treatment step 104, followed by a plasma treatment step 105 with heating (FIG. 6).

According to another example, the method may comprise a first plasma treatment step 105 with heating, followed by a non-plasma treatment step 104, followed by a plasma treatment step 103 without heating.

The treatment method may be followed by a validation step 106 (FIG. 2), in which a parameter representative of the removal of contaminant molecules is measured; the method may be stopped when the representative parameter reaches a reference value indicative of a satisfactory level of desorption from the wall of the transport box 3. For example, the representative parameter may be the total or partial gas pressure in the sealed chamber 2. The total pressure measured in the pumping-limited vacuum regime is an indicator of the flux being desorbed in the sealed chamber 2, mainly resulting from degassing of the transport box.

Thus, by virtue of a plasma surface treatment step, the removal of contaminant molecules is improved and treatment duration decreased.

The invention claimed is:

1. A method for treatment of a plastic transport box for conveyance and atmospheric storage of substrates including walls bounding a volume intended for storage of substrates, the method comprising:

at least one plasma treatment, selected to remove contaminating molecules from at least one interior wall of the transport box via chemical action or mechanical action, the at least one plasma treatment comprising applying a plasma of a treatment gas at a gas pressure lower than 10,000 pascals, wherein, in the at least one plasma treatment, at least the interior wall of the transport box is heated to a temperature in a range from above 50° C. to less than 100° C.; and a non-plasma treatment in which at least the interior wall of the transport box is subjected to combined action of a gas pressure lower than 10,000 pascals and heating to a temperature above 50° C.

2. The treatment method according to claim 1, wherein, in the at least one plasma treatment, the gas pressure is between 1,000 and 0.1 pascals.

3. The treatment method according to claim 1, wherein, in at least one plasma treatment, the treatment gas is chosen from a noble gas, or argon, or from a reactive gas, or oxygen, nitrogen, or water vapour.

4. The treatment method according to claim 1, wherein, in at least one plasma treatment, the plasma is, for a predetermined duration, alternatively ignited and extinguished plural times.

5. The treatment method according to claim 1, wherein, in the non-plasma treatment, the gas pressure is lower than the gas pressure in the at least one plasma treatment.

6. The treatment method according to claim 1, wherein, in the non-plasma treatment, the gas pressure is lower than 100 pascals.

7. The treatment method according to claim 1, further comprising a non-plasma treatment preceded by the at least one plasma treatment.

8. The treatment method according to claim 1, further comprising a non-plasma treatment followed by the at least one plasma treatment.

9. The treatment method according to claim 1, further comprising a non-plasma treatment preceded by a prior plasma treatment and followed by a subsequent plasma treatment, and wherein plasmas of the prior and subsequent plasma treatment are different.

10. A station for treatment of transport boxes for conveyance and atmospheric storage of substrates, comprising:

a sealed chamber configured to receive at least one interior wall of a plastic transport box for conveyance and atmospheric storage of substrates;

a pump connected to the sealed chamber;

at least one infrared radiation source; and a plasma source and a processing unit configured to control the pump, the infrared radiation source, and the plasma source to implement a method for treatment of a plastic transport box for conveyance and atmospheric storage of substrates according to claim 1.

11. A method for treatment of a plastic transport box for conveyance and atmospheric storage of substrates including walls bounding a volume intended for storage of substrates, the method comprising:

at least one plasma treatment, selected to remove contaminating molecules from at least one interior wall of the transport box via chemical action or mechanical action, the at least one plasma treatment comprising applying a plasma of a treatment gas at a gas pressure lower than 10,000 pascals; and a non-plasma treatment in which the at least one interior wall of the transport box is subjected to combined action of a gas pressure lower than 10,000 pascals and heating to a temperature above 50° C.

* * * * *